United States Patent [19]

Gillespie

[11] Patent Number: 5,079,863
[45] Date of Patent: * Jan. 14, 1992

[54] FISHING APPARATUS

[75] Inventor: John E. Gillespie, Yukon, Okla.

[73] Assignee: Aberdeen Oil Company, Yukon, Okla.

[*] Notice: The portion of the term of this patent subsequent to May 23, 2006 has been disclaimed.

[21] Appl. No.: 357,008

[22] Filed: May 24, 1989

Related U.S. Application Data

[62] Division of Ser. No. 152,905, Feb. 5, 1988, Pat. No. 4,831,772.

[51] Int. Cl.⁵ ............................................ A01K 97/06
[52] U.S. Cl. ...................................... 43/54.1; 43/57.1; 43/25.2; 206/315.11
[58] Field of Search ............... 43/25, 54.1, 57.1, 25.2; 206/315.11; 224/920; 220/410

[56] References Cited

U.S. PATENT DOCUMENTS

| | | |
|---|---|---|
| D. 219,973 | 2/1971 | Sather . |
| D. 220,432 | 4/1971 | Leroue . |
| 1,216,069 | 2/1917 | Cammack . |
| 2,370,013 | 2/1945 | Crowell ............................ 206/315.11 |
| 2,533,865 | 12/1950 | Wynne, Sr. et al. . |
| 2,723,484 | 11/1955 | Nelson, Jr. . |
| 2,767,502 | 8/1955 | Reynolds . |
| 2,841,917 | 7/1958 | Haskell . |
| 2,849,825 | 9/1958 | Reisner . |
| 2,993,293 | 7/1961 | Blout . |
| 3,182,872 | 5/1965 | Brosseau ................................ 43/57.1 |
| 3,224,134 | 12/1965 | Holcombe . |
| 3,780,468 | 12/1973 | Maffett .................................. 43/54.1 |
| 4,015,361 | 4/1977 | O'Reilly et al. . |
| 4,203,245 | 5/1980 | Peterson . |
| 4,418,490 | 12/1983 | Ancona . |
| 4,452,003 | 6/1984 | Deutsch et al. . |
| 4,468,882 | 9/1984 | Marusak . |
| 4,589,546 | 5/1986 | Sunderland ........................... 43/57.1 |
| 4,691,469 | 9/1987 | Alsobrook ............................ 43/54.1 |
| 4,729,474 | 3/1988 | Lanius ................................... 43/54.1 |
| 4,739,577 | 4/1988 | Lanius ................................... 43/54.1 |
| 4,756,412 | 7/1988 | Graves .................................. 43/54.1 |
| 4,782,619 | 11/1988 | Richards .............................. 43/54.1 |
| 4,784,304 | 11/1988 | Schwertzer ......................... 224/920 |

FOREIGN PATENT DOCUMENTS 837317 3/1970 Canada ................................. 43/57.1

OTHER PUBLICATIONS

Exhibit A-A brochure entitled the Baintainer T-M-Modular Tackle Storage System. Undated.
Exhibit B-A brochure entitled Line Sickle TM-Pat. Pending ©1987 LCD American, Inc.
Exhibit C-A brochure entitled HIDA TM Hookguard-Practical Tackle Co.
Exhibit D-A brochure advertising Lure Locker TM -- Harness Techniques, Undated.
Exhibit E-Package sold by J. M. Roberts, Co., Inc. of Alameda, Calif., Undated.

*Primary Examiner*—Kurt Rowan
*Attorney, Agent, or Firm*—Dunlap, Codding, Peterson & Lee

[57] ABSTRACT

Fishing apparatus adapted for use with fishing accessories comprising a tackle box with an opening extending through an upper end and forming an inside wall. A first attachment means is disposed generally on a portion of the inside wall in the tackle box. The apparatus includes a container having outside walls generally surrounding a container opening with the container opening intersecting the upper end and being sized for receiving fishing accessories. A second attachement means includes a portion connected to the outside wall of the container. The second attachment means and the first attachment means each are adapted so that the second attachment means is removeably connectable to the first attachment means for removeably connecting the container to the inside of the tackle box. The fishing apparatus also includes a fishing rod with a third attachment means connected to the fishing rod adapted to be removeably connected to the second attachment means for removeably connecting the container to the fishing rod.

23 Claims, 5 Drawing Sheets

FISHING APPARATUS

This application is a division of Ser. No. 152,905, filed Feb. 5, 1988, entitled FISHING APPARATUS, now U.S. Pat. No. 4,831,772.

FIELD OF THE INVENTION

The present invention relates generally to apparatus adapted for use in connection with fishing and, more particularly, but not by way of limitation, the present invention relates to a fishing apparatus which includes a tackle box and a container having a container opening sized for receiving fishing accessories wherein the container is removeably connectable to the tackle box. The present invention also contemplates the container being adapted to be removeably connectable to a fishing rod.

DESCRIPTION OF THE PREFERRED EMBODIMENTS

Figure 1:
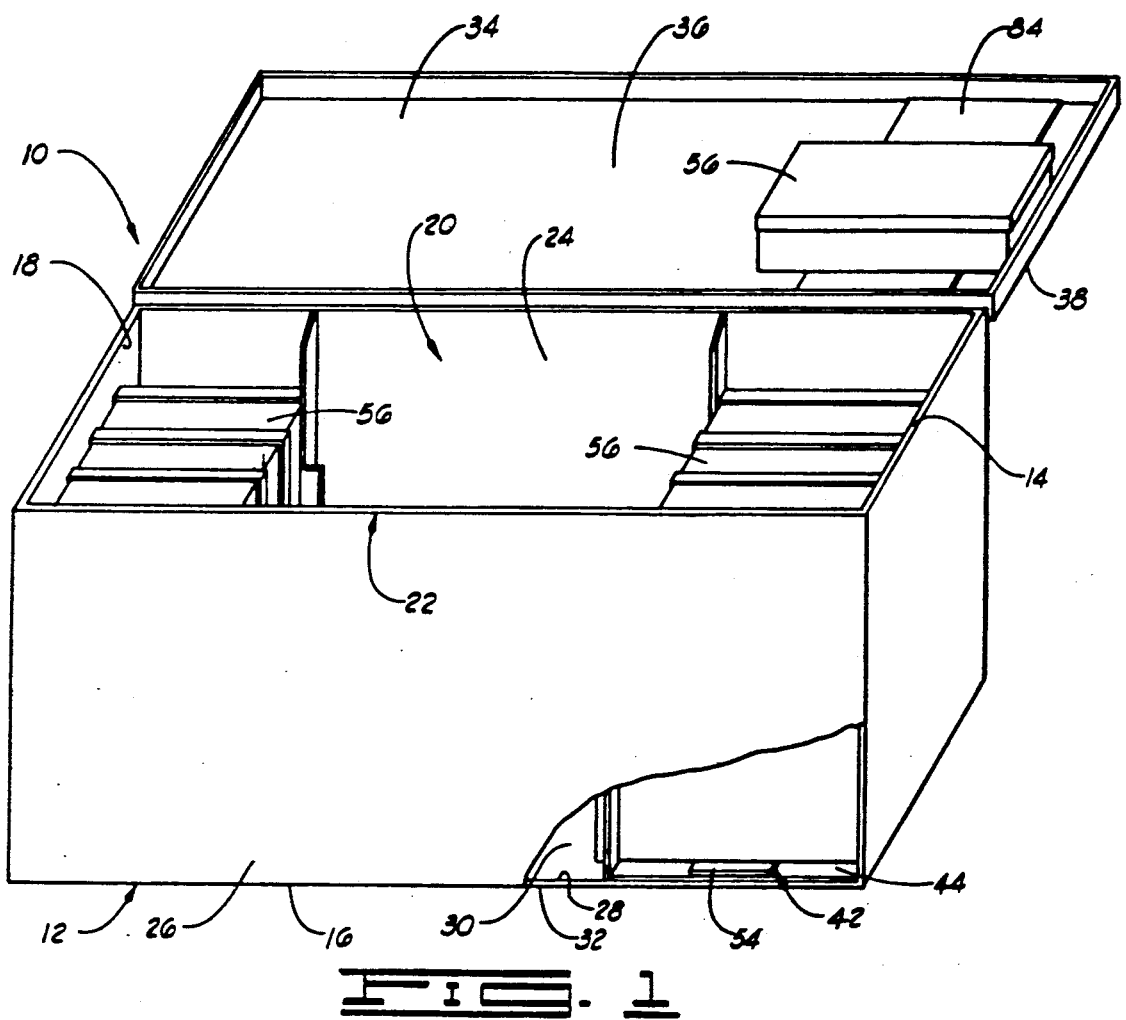
FIG. 1 is a partial perspective view of a tackle box constructed in accordance with the present invention and shown having some containers constructed in accordance with the present invention removeably connected thereto, a portion of the tackle box being cut away to show a portion of the removeable connection between the containers and the tackle box.

Referring to the drawings in general and to FIG. 1 in particular, shown therein and designated by the general reference numeral 10 is a fishing apparatus adapted for use with a fishing accessories. For the most part, the fishing accessories contemplated by the present invention comprise various relative small items commonly used by individuals in connection with fishing such as artificial bait common referred to in general terms as fishing lures and artificial flies, various scenting formulations, hooks, fishing line, relative small first aid equipment and the like. In use, the individual fisherman may store various other items in the fishing apparatus 10 of the present invention which the individual fisherman contemplates may be useful in connection with his or her fishing experiences and which may be of the type not generally thought of as "fishing accessories"; however, such additional items are contemplated by the present invention and the term "fishing accessories" is used herein is intended to contemplate accessories of this type which some individual fisherman might not commonly contemplate "fishing accessories".

As shown in FIG. 1, the fishing apparatus 10 includes a tackle box 12 with an upper end 14 and a lower end 16. An opening 18 is formed through the upper end 14 and extends a distance through the tackle box 12 forming an inside wall 20. The inside wall 20 more particularly comprises side walls 22 having an inside surface 24 and an outside surface 26 and a bottom wall 28 having an inside surface 30 and an outside surface 32. The inside surfaces of the side walls and the bottom wall 22 and 28 comprise the inside wall 20 of the tackle box 12. In the particular embodiment shown in FIG. 1, the side walls 22 and the bottom wall 28 are arranged and sized to form a generally rectangularly shaped tackle box 12 with an opened upper end 14.

A generally rectangularly tackle box lid 34 is moveably connected to the upper end 14 of the tackle box 12. More particularly, one side of the tackle box lid 34 is moveably connected to the upper end 14 of the one of the side walls 22. The tackle box lid 34 is movable from an opened position (shown in FIG. 1) to a closed position (not shown in the drawings). The tackle box lid 34 has an inside surface 36 and an outside surface 38.

In the opened position of the tackle box lid 34, the tackle box lid 34 substantially is removed from the opening 18 in the tackle box 12, thereby providing access to the opening 18. In the closed position of the tackle box 34, the tackle box lid 34 is disposed generally adjacent the upper end 14 of the tackle box 12 and the tackle box lid 34 substantially encompasses and closes the opening 18 in the tackle box 12. The tackle box 12 also includes closure means (not shown) for removeably securing the tackle box lid 34 in the closed position.

First attachment means 42 is disposed generally on a portion of the inside wall 20 of the tackle box 12. More particularly, as shown in FIG. 1, the first attachment means 42 is disposed generally on the inside surface 30 of the bottom wall 28, for reasons which will be made more apparent below.

Figure 2:
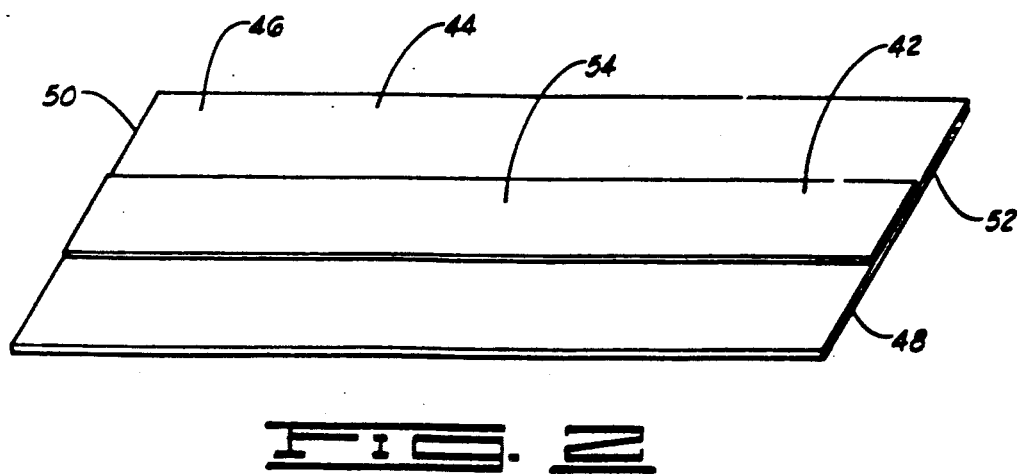
FIG. 2 is a perspective view of a removal plate constructed in accordance with the present invention which is removeably disposable in the tackle box in FIG. 1 and which is adapted to be removeably connected to a plurality of the containers of FIG. 1.
Figure 3:
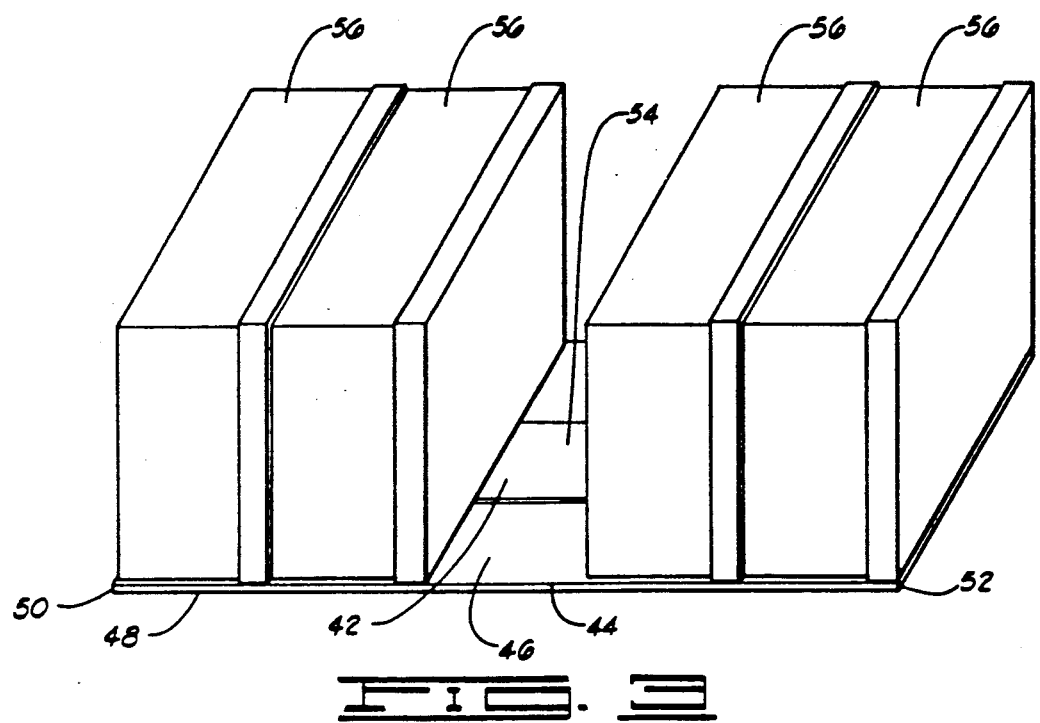
FIG. 3 is a partial perspective view of the removal plate of FIG. 2 showing four containers removeably connected thereto with an open space for receiving a fifth container to be removeably connected to the removal plate.

As shown in FIGS. 1, 2 and 3, the first attachment means 42 includes a plate 44 having an upper surface 46, a lower surface 48, a first end 50 and a second end 52. An attachment material 54 such as Velcro is secured to the upper surface 46 of the plate 44 and extends generally between the first and the second ends 50 and 52 of the plate 44.

As shown in FIGS. 1, 3, 4 and 5, the fishing apparatus 10 also includes a plurality of containers 56, each of the containers 56 being identical in construction, only some of the containers 56 being designated by a reference numeral in FIG. 1. In a practical application, the containers 56 may be of different sizes.

Each container 56 includes outside walls 58 (FIGS. 4 and 5) generally surrounding a portion of a container opening 60 (FIG. 4), the container opening 60 being sized for receiving fishing accessories to be contained generally within the container 56.

Figure 4:
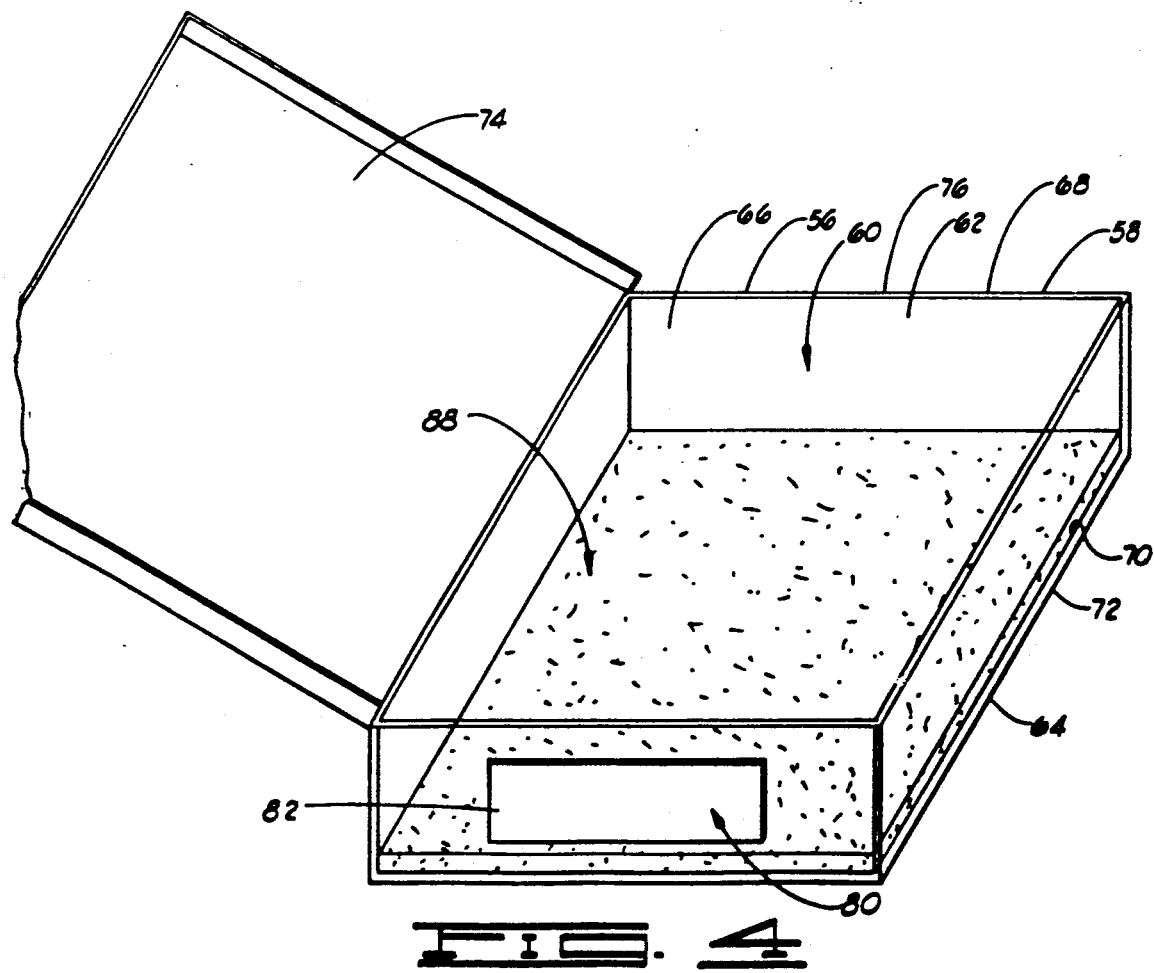
FIG. 4 is a partial prospective view of a typical container of the type removeably connectable to the tackle box and to the fishing rod as shown in FIGS. 7 and 8.
Figure 5:
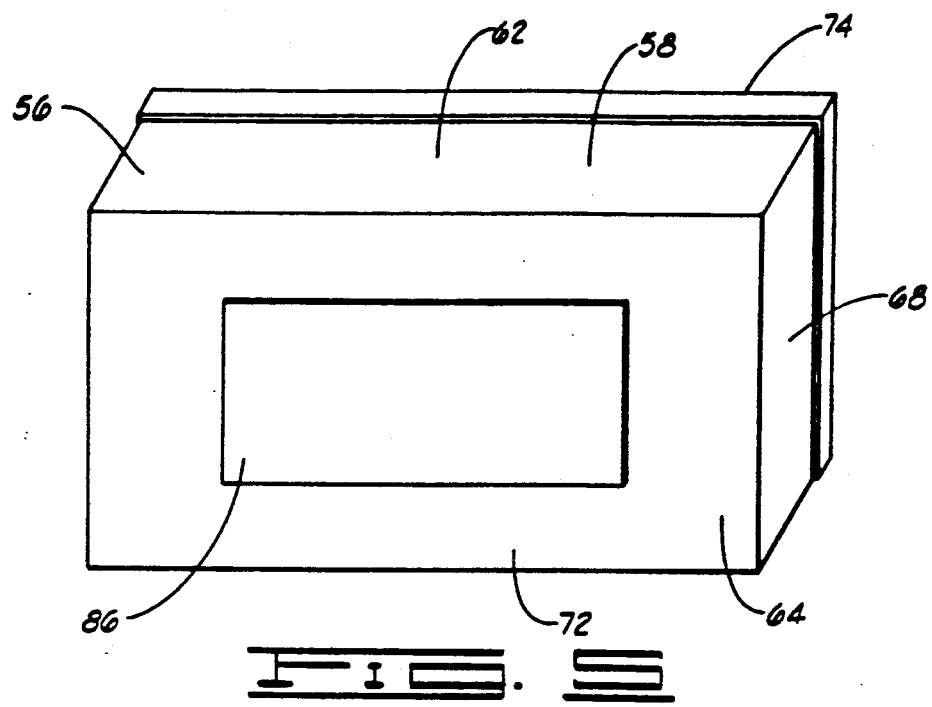
FIG. 5 is a partial perspective view showing the bottom of the container of FIG. 4.

As shown in FIGS. 4 and 5, the container 56, more particularly, includes side walls 62 and a bottom wall 64. The side walls 62 have an inside surface 66 and an outside surface 68 and the bottom wall has an inside surface 70 and an outside surface 72. The side walls 62 and the bottom wall 64 comprise the outside walls 58 of the container 56.

As shown in FIGS. 4 and 5, container lid 74 is moveably connected to an upper end 76 of the container 56 side walls 62. More particular, one side of the container lid 74 is moveably connected to the upper end 76 of one of the side walls 62. The container lid 74 is movable to an opened position and to a closed position. The container lid 74 is sized and shaped so that the container lid 74 substantially closes the container opening 60 in the closed position of the container lid 74 (shown in FIG. 5) and so the container lid 74 substantially is removed from the container opening 60 in the opened position thereby providing access to the container opening 60. The container opening 60 is sized and shaped to receive fishing accessories to be retained generally within the container opening 60 in the closed position of the container lid 74.

A second attachment means 80 (shown in FIG. 4) includes a portion connected to a portion of the outside walls 58 of the container 56. More particularly, the second attachment means 80 includes a portion connected to the outside surface 68 of the one of the side walls 62, as shown more clearly in FIG. 4. A portion of the second attachment means 80 connected to the outside surface 68 of one of the side walls 62, more particularly, comprises a strip of attachment material 82, such as Velcro. The second attachment means 80 and the first attachment means 42 each are adapted so that the second attachment means 80 is removeably connectable to the first attachment means 42 for removeably connecting the container 56 to the inside wall 20 of the tackle box 12. More particularly, the second attachment means 80 is adapted to be removeably connected to the portion of the first attachment means 42 connected to the plate 44 for removeably connecting the container 56 to the plate 44.

The first attachment means also includes a portion which is connected to the inside surface 36 of the tackle box lid 34, as shown in FIG. 1. More particularly, the second attachment means 80 includes attachment material 84 which is secured to the inside surface 36 of the tackle box lid 34. The attachment material 84 also is a Velcro type of material.

The second attachment means includes a portion connected to the outside surface 72 of the bottom wall 64 of the container 56. This portion of the second attachment means comprises an attachment material 86 (shown in FIG. 5) such as Velcro material which is secured to the outside surface 72 of the bottom wall 64 of the container 56. The attachment materials 84 and 86 each are adapted so that the container 56 can be removeably secured to the inside surface 78 of the container lid 74. As shown more clearly in FIG. 1, the tackle box lid 34 is sized and the attachment material 84 is sized so that a plurality of containers 56 can be removeably secured or connected to the inside surface 78 of the container lid 74, only one containers being shown in FIG. 1 connected to the inside surface 36 of the tackle box lid 34.

It should be noted that it has been found with respect to particular embodiments of the invention that it is desirable to omit the first attachment means and thus eliminate the attaching of containers 56 to the lid 74.

As shown in FIG. 4, the container 56, in one preferred embodiment, includes an absorbent pad 88 disposed on the inside surface 70 of the bottom wall 64. The absorbent pad 88 is constructed and adapted to receive and absorb scented material so that fishing accessories, such as artificial lures, can be disposed in the container opening 60 generally on the absorbent pad 88 and so the absorbent pad 88 then can impart the scented smell to the artificial bait disposed thereon during the time the artifical bait is retained generally within the container 56. Various types of materials are suitable for constructing the absorbent pad 88 in accordance with the present invention, one such material being commerically available from Gray Plastic Packaging Corp. of Bronyx, N.Y. designated as "polyester foam" with various model numbers corresponding to different colors with one typical model number for a yellow pad material being designated by the Model No. 916, for example.

Figure 6:
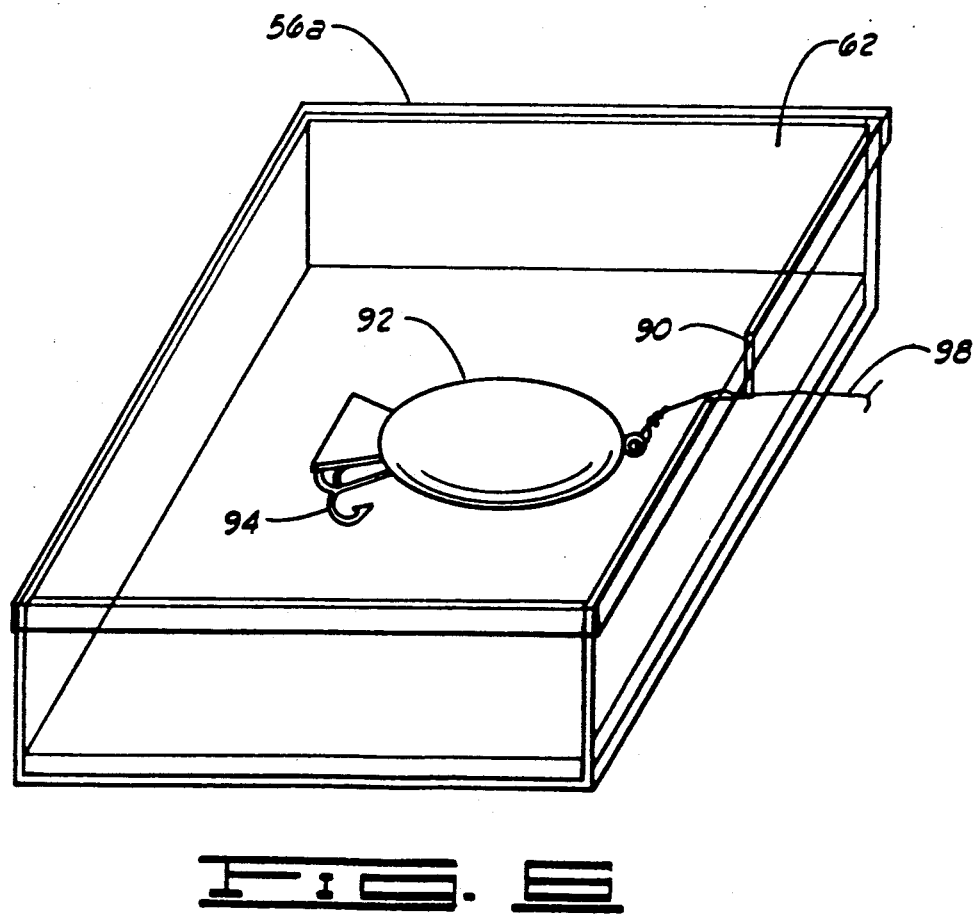
FIG. 6 is a partial perspective view of a typical modified container for holding a fishing accessory of the type referred to as artificial bait, a typical artificial bait being shown disposed in the container in FIG. 6 with a segment of a fishing line being shown in FIG. 6 connected to the artificial lure.

Shown in FIG. 6, is a modified container 56a which is constructed exactly like the container 56 shown in FIGS. 1, 3, 4 and 5 except the container 56a includes a line slot 90 formed in the upper end of one of the side walls 62. A typical artificial bait is shown in FIG. 6 disposed in the container opening 60 and designated therein by the general reference numeral 92. As diagrammatically illustrated in FIG. 6, artificial bait commonly includes hooks 94 (only some of the hooks 94 being designated by reference numerals in FIG. 6). The artifical bait 92 is connected to one end of a fishing line, a fishing line being partially shown in FIG. 6 and designated therein by the reference numeral 98. In operation, the artificial bait 92 is disposed in the container opening 60 with a portion of the fishing line 98 extending through the line slot 90. With the container lid 74 in the closed position, the fishing line 98, thus extends through the line slot 90. In practice, a connecting eye of the artificial bait 92 or a swivel or other connection to the artificial bait 92 can extend outside the container 56a so that the fishing line 98 can be connected to the artificial bait 92 without the individual fisherman actually handling the artificial bait 92, the individual fisherman handling only the container 56a containing the artificial bait 92 during the connecting of the fishing line 98. When connecting the fishing line 98 to the artificial bait 92 in this manner, the fisherman does not have to handle the artificial bait 92 and thus the individual fisherman is not exposed to the hooks 94 of the artificial bait 92 during this connecting process. This particular embodiment of the container 56a is also useful with the fishing rod 100, shown in FIGS. 7 and 8 in a manner to be described in greater detail below.

Figure 7:
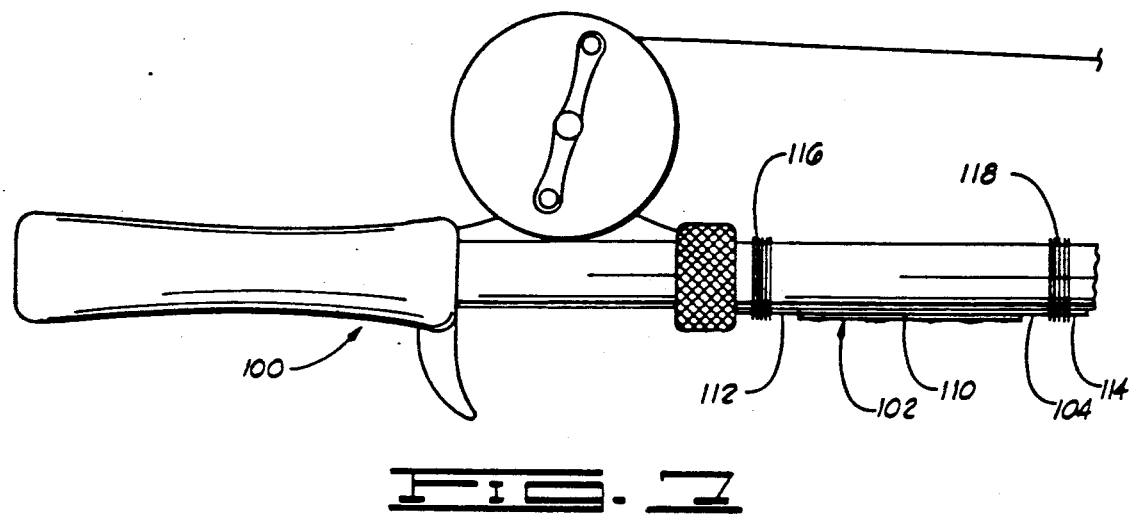
FIG. 7 is a partial perspective, partial diagrammatic view of a segment of a fishing rod with a third attachment means connected thereto and adapted for being removeably connectable to the container shown in FIGS. 4 and 5 or 6.
Figure 8:
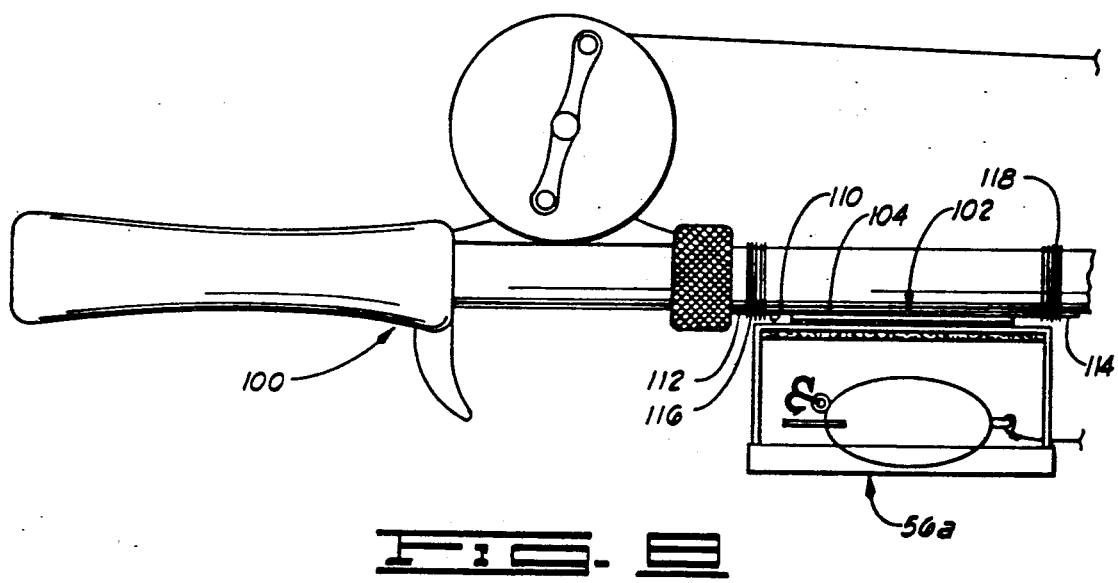
FIG. 8 is a view similar to FIG. 7, but showing a container removeably connected to the third attachment means on the fishing rod.

Fishing apparatus 10 also contemplates the fishing rod 100 with a third attachment means 102 being connected to the fishing rod 100, as shown in FIGS. 7 and 8. The third attachment means 102 is adapted to be removeably connected to a portion of the second attachment means 80 for removeably connecting the container 56 or 56a to the fishing rod 100, the fishing rod 100 with the third attachment means 102 connected thereto being shown in FIG. 7 and the fishing rod 100 being shown in FIG. 8 with a container 56a removeably connected thereto by way of a portion of the second attachment means 80 and the third attachment means 102.

Figure 9:
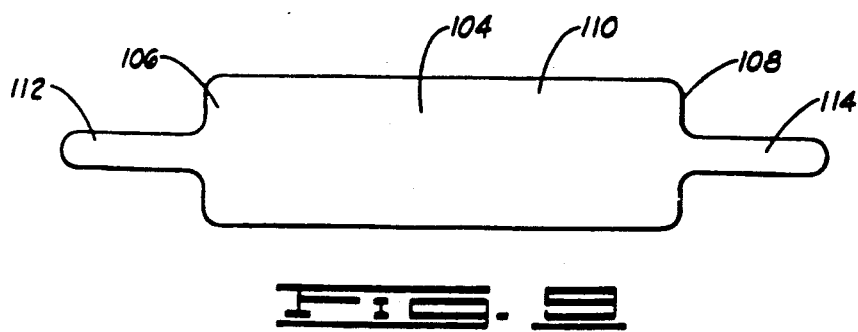
FIG. 9 is a plan view of a plate portion of a third attachment means shown in FIGS. 7 and 8.

As shown more clearly in FIG. 9, the third attachment means 102 comprises a rod plate 104 having opposite ends 106 and 108 and an upper surface 110. A protrusion 112 extends generally from the end 106 of the rod plate 104 and another protrusion 114 extends a distance generally from the opposite end 108 of the rod plate 104. Attachment material is secured to the upper surface 110 of the rod plate 104.

The rod plate 104 is disposed generally on a portion of the rod and the rod plate 104 is connected to the rod by wrapping material generally about the rod and about the protrusion 112 and 114 is shown more clearly in FIG. 7. As shown in FIG. 7, securing material 116 is wrapped about a portion of the fishing rod 100 and about a portion of the protrusion 112 and securing material 118 is wrapped about a portion of the fishing rod 100 and about a portion of the protrusion 114, the securing materials 116 and 118 cooperating to secure the rod plate 104 to the fishing rod 100.

In some instances, the rod plate 104 may be incorporated in the fishing rod 100. In fact, a portion of the fishing rod 100 may be modified to comprise the third attachment means 102 and the term "rod plate" as used herein is intended to encompass those instances where a portion of the fishing rod 100 is shaped to receive the attachment material.

In operation, the individual fisherman would place various fishing accessories in the various containers 56. Some of the containers 56 then would be removeably secured to the removal plate 44, the removal plate 44 and the attachment material 54 connected thereto being shown in FIG. 3 as being adapted so that five containers 56 may be removeably connected thereto. The removal plate 44 with the containers 56 removeably connected thereto then, as an assembly, can be disposed in the opening 18 in the tackle box 12 and positioned so the removal plate 44 is disposed generally on the inside surface 30 of the bottom wall 28. Thus, a plurality of containers 56 can be removeably inserted into and removed from the opening 18 in the tackle box 12. As indicated in FIG. 1, the present invention contemplates a plurality of removal plates 44 with each removal plate 44 having removably connected thereto a plurality of containers 56. In addition, a plurality of containers 56 also are removeably secured to the inside surface 36 of the tackle box lid 34, as indicated in FIG. 1.

Thus, the individual fisherman has fishing accessories stored in the tackle box 12 in individual containers 56 and the containers 56 containing such fishing accessories are removeably secured to the tackle box 12, thereby preventing such containers 56 from moving, shifting or otherwise rattling or becoming disorganized during transportation of the tackle box 12. In addition, the individual fisherman now can organize fishing accessories by anticipated need so that all accessories for a particular fishing occasion might be removeably attached to one of the removal plates 44 and then all the individual fisherman has do is remove the particular removal plate 44 with the particular containers 56 removeably attached thereto and transport the removal plate 44 with the particular containers 56 removeably attached thereto to a point of use. In this manner, the individual fishermen would have all of the fishing accessories required at the point of use, all contained in the containers 56 attached to one of the removal plates 44. Obviously, all of the fishing accessories for a particular occassion also could be attached to two of the removal plates 44.

It is contemplated that at least some of the containers 44 also include the absorbent pad 88, as shown in FIG. 6. In this manner, the fisherman can store particular fishing accessories such as artificial bait 92 in the particular containers 56a and the artificial bait stored therein will be exposed to the scent during the storage of the artificial bait 92 in the containers 56a. Thus, when the individual fisherman desires to use the artificial bait, the artificial bait already has absorbed thereon the particular desired scent.

Further, the individual fisherman may store particular artificial bait 92 in the modified containers 56a with the connection for the artificial bait 92 extending from the containers 56a. When the fisherman desires to use a particular artificial bait, the individual fisherman removes the container 56a containing the desired artificial bait and the individual fisherman then can attach the fishing line 98 to the artificial bait 92 without removing the artificial bait 92 from the container 56. The container 56a with the artificial bait 92 contained therein and with the fishing line 98 connected thereto then can be removeably attached to the fishing rod 100 by way of the third attachment means 102 connected to the fishing rod 100. When it is desired to use the particular artificial bait in a fishing situation, the individual fisherman simply removes the artificial bait from the container 56a and utilizes the artificial bait in a known manner for fishing purposes. While fishing, the container 56a can remain removeably attached to the fishing rod 100 thereby providing a quick and readily available means for restoring the artificial bait 92 during times of brief usage. When the fishing experience is terminated at least with respect to the particular artificial bait stored in the particular container 56a removeably attached to the fishing rod 100, the individual fisherman simply disposes the artificial bait 92 in the container opening 60 with the line 98 extending through the line slot 90 and then the individual fisherman closes the container lid 74. After closing the container lid 74, the individual fisherman simply disconnects the fishing line 98 from the artificial bait 92 and the container 56a with the artificial bait 92 therein can be reattached to the removal plate 44 or to the inside surface 36 of the tackle box lid 34.

Figure 10:
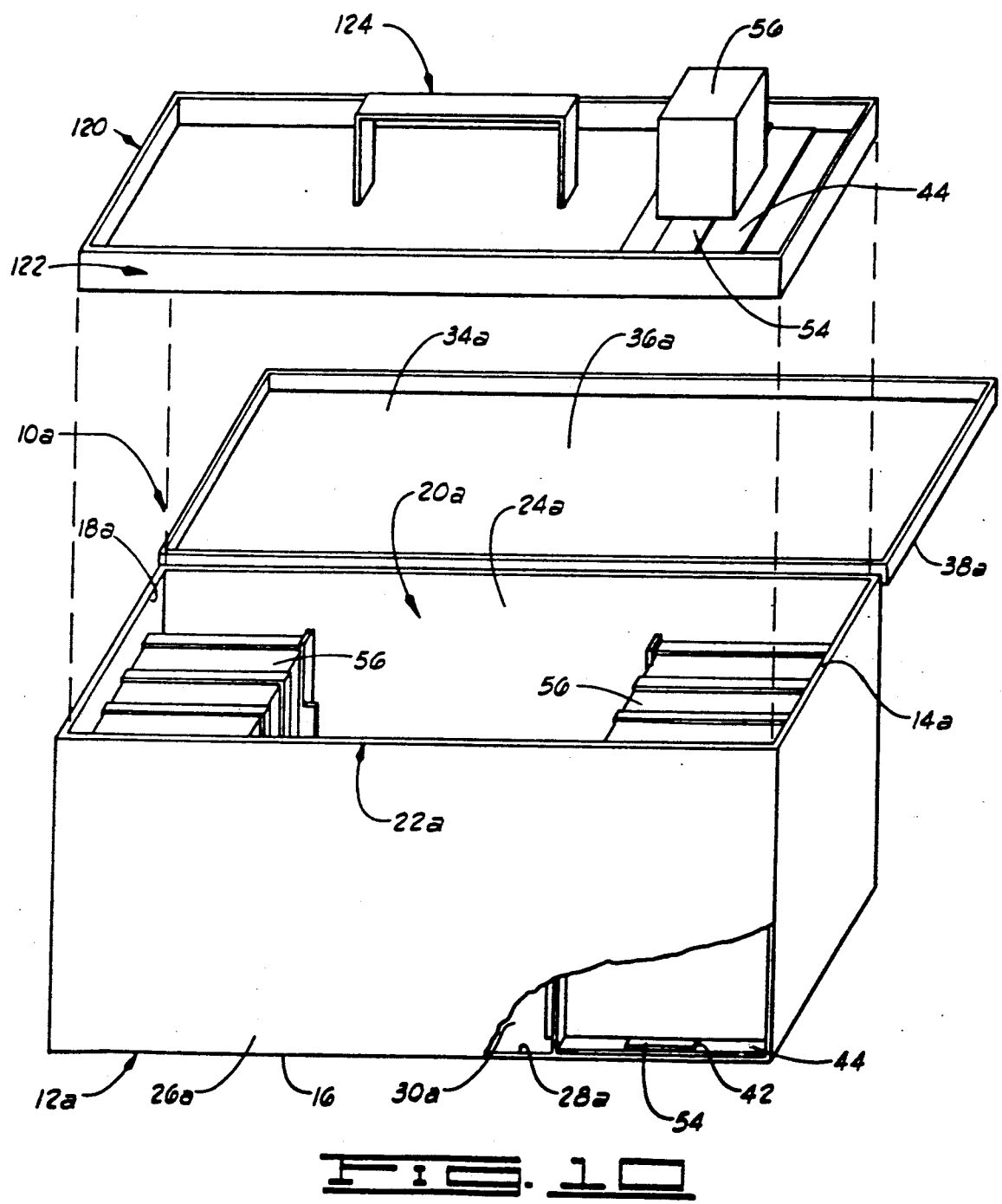
FIG. 10 is a partial perspective view of a tackle box constructed similar to the tackle box shown in FIG. 1 and a partial perspective view of a tray which is removably insertable into the tackle box.

Shown in FIG. 10 is a tackle box 12a which is constructed exactly like the tackle box 12 shown in FIG. 1 and described in detail before, except the tackle box 12a does not include attachment material 84 connected to the tackle box lid 34a. Further, the tackle box 12a is adapted to receive and support a tackle tray 120. The tackle tray 120 includes a tray 122 portion with a handle 124 connected to a central portion of the tray 122.

The tray 122 is sized and shaped to receive and support at least one removal plate 44 with containers 56 removably connected thereto. In addition, the tray 122 is shaped and adapted to support additional or other fishing accessories.

Utilizing the tackle tray 120, the individual fisherman, can organize fishing accessories by anticipated need so that all accessories for a particular fishing occasion might be removably supported on the tray 122, including the removal plate 44 with the containers 56 removably attached thereto. In this manner, the fisherman would have all of the fishing accessories required at the point of use for a particular fishing occasion by simply removing the tackle tray 120 and transporting the tackle tray 120 fishing site, the tackle tray 120 being removable from the tackle box 12a by way of the handle 124.

Although the present invention specifically has been described herein with respect to fishing apparatus and fishing accessories it should be noted that the tackle box 12 and the containers 56 removeably connected thereto can be utilized for storing various other accessories such as nuts, bolts, screws or any other small items desired to be stored.

Either the tackle box or the containers or both or some of the containers can be constructed of a soft, flexible material. In this instance, the tackle box would be folded-up for carrying.

Changes may be made in the construction and the operation of the various components, assemblies and elements described herein without departing from the spirit and the scope of the invention as defined in the following claims.

What is claimed is:

1. A fishing apparatus adapted for use with fishing accessories, comprising:
   a tackle box having an upper end and a lower end with an opening extending through the upper end and forming an inside wall;
   first attachment means disposed generally on a portion of the inside wall in the tackle box;
   a plurality of containers, each container having outside walls generally surrounding a portion of a container opening and having an upper end and a lower end with the container opening intersecting the upper end, each container opening being sized for receiving fishing accessories;
   a plurality of second attachment means, each second attachment means having a portion connected to the outside wall of one of the containers, each second attachment means and the first attachment means being adapted so each second attachment means is removably connectable to the first attachment means for removably connecting each of the containers to the inside wall of the tackle box; and
   a removal plate shaped and adapted for removable insertion into the opening in the tackle box and being disposable and supportable within the tackle box, a portion of the first attachment means being connected to the removal plate and adapted to be removably connected to portions of the second attachment means on the containers whereby a plurality of the containers are removably connectable to the removal plate by way of the first and the second attachment means.

2. The fishing apparatus of claim 1 defined further to include a plurality of removal plates, each removal plate being removeably insertable within the opening in the tackle box and each removal plate having a portion of the second attachment means connected thereto for removeably connecting a plurality of containers to each removal plate.

3. The fishing apparatus of claim 2 defined further to include:
   a tackle box lid moveably connected to the upper end of the tackle box for movement to an open position and to a closed position, the tackle box lid substantially closing the opening in the tackle box in the closed position of the tackle box lid and the tackle box lid being substantially removed from the opening in the tackle box in the open position of the tackle box lid, the tackle box lid having an inside surface; and
   wherein the first attachment means is defined further to include portions connected to the inside surface of the tackle box lid, some of the containers being removeably connected to the inside surface of the tackle box lid by way of the first and second attachment means.

4. A fishing apparatus adapted for use with fishing accessories, comprising:
   a tackle box having an upper end and a lower end with an opening extending through the upper end and forming an inside wall;
   first attachment means disposed generally on a portion of the inside wall in the tackle box;
   a plurality of containers, each container having outside walls generally surrounding a portion of a container opening and having an upper end and a lower end with the container opening intersecting the upper end, each container opening being sized for receiving fishing accessories;
   a tackle box lid moveably connected to the upper end of the tackle box for movement to an open position and to a closed position, the tackle box lid substantially closing the opening in the tackle box in the closed position of the tackle box lid and the tackle box lid being substantially removed from the opening in the tackle box in the open position of the tackle box lid, the tackle box lid having an inside surface;
   a plurality of second attachment means, each second attachment means having a portion connected to the outside wall of one of the containers, each of the second attachment means and the first attachment means being adapted so that each of the second attachment means is removably connectable to the first attachment means for removably connecting the containers to the inside wall of the tackle box, the first attachment means including a portion connected to the inside surface of the tackle box lid whereby some of the containers are removably connectable to the inside surface of the tackle box lid by way of the first and the second attachment means.

5. The fishing apparatus of claim 4 also adapted for use with a fishing rod and defined further to include:
   third attachment means connected to the fishing rod and adapted to be removeably connected to the second attachment means for removeably connecting the container to the fishing rod.

6. The fishing apparatus of claim 5 defined further to include:
   a rod plate connected to the fishing rod, the third attachment means being connected to the rod plate.

7. A fishing gapparatus adapted for use with fishing accessories, comprising:
   a tackle box having an upper end and a lower end with an opening extending through the upper end and forming an inside wall;
   first attachment means disposed generally on a portion of the inside wall of the tackle box with the first attachment means comprising Velcro ®;
   a container having outside walls generally surrounding a portion of a container opening and having an upper end and a lower end with the container opening intersecting the upper end, the container opening being sized for receiving fishing accessories; and
   a second attachment means having a portion connected to a portion of the outside wall of the container, the second attachment means and the first attachment means each being adapted so the second attachment means is removably connectable to the first attachment means for removably connecting the container to the inside wall of the tackle box, the second attachment means comprising Velcro ®.

8. The fishing apparatus of claim 7 wherein the container is defined further as having side walls with an inside surface and an outside surface and a bottom wall with an inside surface and an outside surface, the outside surfaces of the side walls and the bottom wall forming the outside wall of the container.

9. The fishing apparatus of claim 7 defined further to include:
a container lid moveable connected to the upper end of the container and being moveable to an open and to a closed position, the container lid substantially closing the container opening in the closed position and the container lid being substantially removed from the container opening in the open position.

10. The fishing apparatus of claim 7 defined further to include:
a tackle tray adapted to receive and support fishing accessories and being removably insertable within the tackle box, the tackle tray being generally removably supported within the opening in the tackle box.

11. The fishing apparatus adapted for use with fishing accessories and a fishing rod, comprising:
a container having outside walls generally surrounding a portion of a container opening and having an upper end and a lower end with the container opening intersecting the upper end, the container opening being sized for receiving fishing accessories;
second attachment means having a portion connected to a portion of the outside wall of the container;
a rod plate connected to the fishing rod; and,
third attachment means connected to the rod plate and adapted to be removably connected to the second attachment means for removably connecting the container to the rod plate.

12. The fishing apparatus of claim 11 wherein the third attachment means and the second attachment each are defined further as comprising Velcro.

13. The fishing apparatus of claim 11 wherein the second attachment means is defined further as including a portion connected to the bottom wall for removably connecting the container to the third attachment means on the fishing rod.

14. The fishing apparatus of claim 11 wherein the second attachment means is defined further as comprising Velcro.

15. The fishing apparatus of claim 11 wherein the third attachment means and the second attachment each are defined further as comprising Velcro.

16. The fishing apparatus adapted for use with fishing accessories comprising:
a tackle box having an upper end and a lower end with an opening extending through the upper end and forming an inside wall;
first attachment means disposed generally on a portion of the inside wall in the tackle;
a container having outside walls generally surrounding a portion of a container opening and having an upper end and a lower end with the container opening intersecting the upper end, the container opening being sized for receiving fishing accessories;
second attachment means having a portion connected to a portion of the outside wall of the container, the second attachment means and the first attachment means each being adapted so the second attachment means is removably connectable to the first attachment means for removably connecting the container to the inside wall of the tackle box; and
third attachment means connected to the fishing rod adapted to be removeably connected to the second attachment means for removeably connecting the container to the fishing rod.

17. The fishing apparatus of claim 16 wherein the container is defined further as having side walls with an inside surface and an outside surface and a bottom wall with an inside surface and an outside surface, the outside surfaces of the side walls and the bottom wall forming the outside wall of the container.

18. The fishing apparatus of claim 16 further comprising:
a container lid moveable connected to the upper end of the container and being movable to an open and to a closed position, the container lid substantially closing the container opening in the closed position and the container lid being substantially removed from the container opening in the open position.

19. The fishing apparatus of claim 16 wherein the outside walls of the container are defined further to include side walls and a bottom wall, and wherein the second attachment means is defined further as including a portion connected to the side walls for removably connecting the container to said first attachment means.

20. A fishing apparatus adapted for use with fishing accessories, comprising:
a tackle box having an upper end and a lower end with an opening extending through the upper end and forming an inside wall;
first attachment means disposed generally on a portion of the inside wall in the tackle;
a container having outside walls generally surrounding a portion of a container opening and having an upper end and a lower end with the container opening intersecting the upper end, the container opening being sized for receiving fishing accessories;
second attachment means having a portion connected to a portion of the outside wall of the container, the second attachment means being removably connectable to the first attachment means for removably connecting the container to the inside wall of the tackle box;
a rod plate connected to the fishing rod;
third attachment means connected to the fishing rod plate and adapted to be removably connected to the second attachment means for removeably connecting the container to the rod plate.

21. A fishing apparatus adapted for use with fishing accessories, comprising:
a tackle box having an upper end and a lower end with an opening extending through the upper end and forming an inside wall;
first attachment means disposed generally on a portion of the inside wall in the tackle;
a container having outside walls generally surrounding a portion of a container opening and having an upper end and a lower end with the container opening intersecting the upper end, the container opening being sized for receiving fishing accessories, the outside walls of the container comprising side walls and a bottom wall;

second attachment means having a portion connected to the bottom wall of the container, the second attachment means being removably connectable to the first attachment means for removably connecting the container to the inside wall of the tackle box;

third attachment means connected to the fishing rod and adapted to be removably connected to the portion of the second attachment means connected to the bottom of the container for removably connecting the container to the third attachment means of the fishing rod.

22. A fishing apparatus adapted for use with fishing accessories, comprising:

a tackle box having an upper end and a lower end with an opening extending through the upper end and forming an inside wall, the tackle box including side walls having an inside surface and an outside surface and a bottom wall having an inside surface and an outside surface, the inside surfaces of the side wall and the bottom wall forming the inside wall of the tackle box;

first attachment means disposed generally on the inside surface of the bottom wall;

a container having outside walls generally surrounding a portion of a container opening and having an upper end and a lower end with the container opening intersecting the upper end, the container opening being sized for receiving fishing accessories, the outside walls of the container comprising side walls and a bottom wall; and second attachment means having a portion connected to a portion of the outside wall of the container, the second attachment means and the first attachment means each being adapted so the second attachment means is removably connectable to the first attachment means for removably connecting the container to the inside wall of the tackle box.

23. A fishing apparatus adapted for use with fishing accessories, comprising:

a tackle box having an upper end and a lower end with an opening extending through the upper end and forming an inside wall;

a tackle tray adapted to receive and support fishing accessories and being removably insertable within the tackle box, the tackle tray being generally removably supported within the opening in the tackle box;

a removal plate shaped and sized for being removably insertable into the tackle tray and being disposable and supportable generally on the tackle tray;

first attachment means disposed generally on a portion of the inside wall in the tackle box;

a plurality of containers, each container having outside wall generally surrounding a portion of a container opening and having an upper end and a lower end with the container opening intersecting the upper end, each container opening being sized for receiving fishing accessories;

a plurality of second attachment means, each second attachment means having a portion connected to a portion of the outside walls of one of the containers, each second attachment means and the first attachment means being adapted so that each second attachment means is removably connectable to the first attachment means for removably connecting one of the containers to the inside wall of the tackle box, a portion of the first attachment means being connected to the removal plate and adapted to be removably connected to portions of at least some of the second attachment means on the containers whereby at least some of the containers are removably connectable to the removal plate by way of the first and the attachment means.

* * * * *